UNITED STATES PATENT OFFICE.

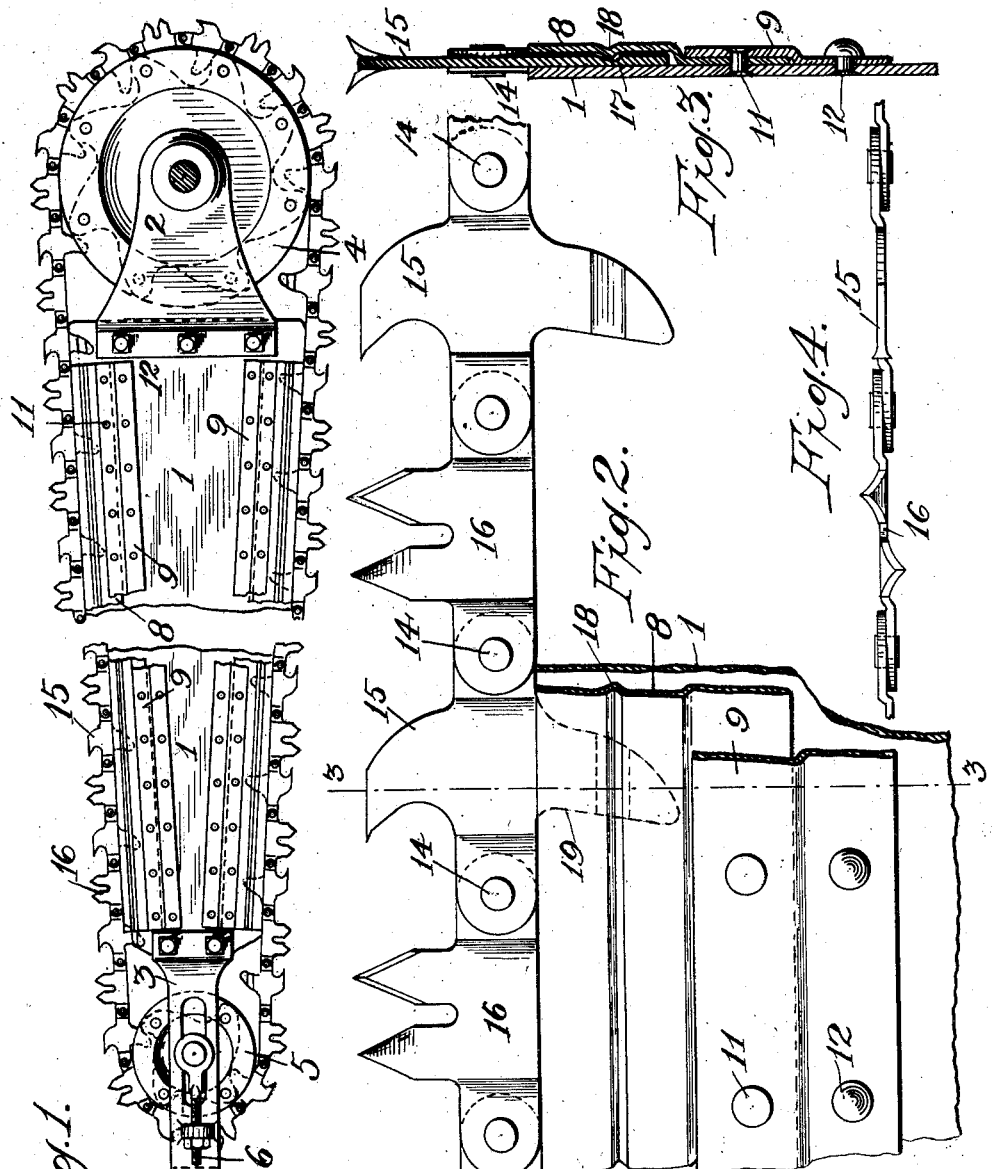

SAMUEL J. BENS, OF SAN FRANCISCO, CALIFORNIA, ASSIGNOR TO WEST COAST MACHINERY COMPANY, OF SAN FRANCISCO, CALIFORNIA, A CORPORATION OF CALIFORNIA.

ENDLESS CHAIN SAW.

No. 893,897.           Specification of Letters Patent.           Patented July 21, 1908.

Application filed February 23, 1906. Serial No. 302,537.

*To all whom it may concern:*

Be it known that I, SAMUEL J. BENS, citizen of the United States, residing at San Francisco, in the county of San Francisco and State of California, have invented certain new and useful Improvements in Endless Chain Saws, of which the following is a specification.

In Letters Patent granted January 17, 1905 and numbered 780,476 I described a saw comprising a chain of links carrying saw teeth and running in a guide frame. If such guide frames are of considerable length as in practical use they ought to be, I have found that they are liable to lack the stiffness requisite for doing effective work, especially when that work is of a heavy character as for instance with the huge redwood timber of the Pacific coast.

While the general objects of the present invention are substantially the same as those set forth in the Letters Patent referred to, I have devised and herein describe and show various and useful improvements upon that construction, tending to increase its efficiency and usefulness. Thus I have provided means for reinforcing and consequently stiffening the guide frame, and also a better arrangement and construction of saw teeth, I provide alternately arranged cutting teeth and dragging teeth, the latter operating to keep the saw-kerf clear. I have also devised a better means for holding the cutting blades in the frame while at the same time such blades are easily removable and replaceable in cases when renewal or re-sharpening or any kind of repair work is required.

My invention is embodied in the accompanying drawings in connection with which this specification should be read.

Figure 1 is a side elevation: Fig. 2 is an enlarged side elevation partly in section to better illustrate the relations of the cutting blades and dragging blades; Fig. 3 is a cross section on the line 3—3 of Fig. 2; Fig. 4 is a plan or edge view of the chain of blades; Fig. 5 is a perspective view of one of the cutting blades.

The saw frame 1 is a sheet of steel preferably tapering in side elevation and having bolted to its ends the brackets 2 and 3 in which are journaled the guide wheels 4 and 5. These wheels have deeply toothed peripheries as shown in dotted lines in Fig. 1, so that they are sprocket wheels upon and around which the endless chain saw is carried with ample clearance. The wheel 5 is preferably mounted in an adjustable bearing having a screw 6 for the purpose of regulating the tension. The supporting bracket of this wheel also has the handle 7 by which the operator controls the saw.

In my patent referred to I described and showed some features which have been omitted from the present description and drawings. Thus it has been considered unnecessary to describe and show different adaptations of the saw to horizontal and vertical work, or any means for driving such being shown in the patent referred to. The sheet or frame 1 is reinforced and stiffened preferably in the manner illustrated in the drawings. I prefer to provide a double reinforcement as best indicated in Figs. 2 and 3 and at the same time provide a guide groove for the chain. The steel strip 8 bent as shown in Fig. 3, and the associated strip 9, are firmly riveted to the saw frame and to each other as shown at 11 and 12. The space between the frame 1 and the strip 8, forms a guide groove for the chain of teeth. As shown in Fig. 1 these reinforcing strips are provided at both edges of the frame 1, upon one side.

Within the guide groove formed between the frame 1 and the reinforcing strip 8, and also upon the toothed wheels at each end, runs the endless chain of saw blades. The teeth of this chain are formed as links flexibly joined together by rivets 14. The teeth are alternately cutting teeth 16 and dragging or clearing teeth 15. The drag teeth are shaped as shown in Fig. 5 and are rolled with the groove 17, so that the rolled bead 18 formed on the reinforcing strip 8 can enter said groove whereby the drag teeth are guided in their movements. Each drag tooth is also provided with the downward projection 19 which extends into the guide groove, and also acts as a sprocket tooth in the recesses of the carrying wheels. The cutting teeth are preferably formed in pairs as shown with the respective members of each pair bent outwardly and oppositely.

By reference to Fig. 4 it will be seen that the manner of bending the associated links which form the cutting blades and the drag blades form a very thin flexible chain in which the cutting blades are always in the middle longitudinal axis.

While I have shown means for locking the chain in the guide frame, comprising a bead on the reinforcing strip and a groove in the extension of each drag tooth, it may under some conditions not be necessary to use such a lock, as for instance in sawing in a vertical plane; and it should also be said that the grooved extensions 19 can be formed with the cutting teeth 16, instead of with the drag teeth 15. Indeed all the teeth might be provided with such grooved extensions or projections; but as this arrangement would require an unnecessary number of sprocket teeth in the guide pulleys; and as such projections upon alternate teeth are amply sufficient for guiding means I have so preferred to show them.

What I claim is:—

1. In an endless chain-saw, the combination with the saw composed of blades linked together, of a grooved saw-frame comprising a flat plate and reinforcing strips at one side and in part spaced therefrom to provide a guide groove or channel, a second reinforcing strip bent to fit the first strip and plate, rivets securing said strips to the plate and to each other, and other rivets independently securing the second named strip to the plate.

2. In an endless chain saw, a plane flat saw frame, in combination with a double reinforcement or stiffening comprising strips at one side of said frame and adjacent to its edges but separated from said edges so as to form guide grooves, a second reinforcing strip bent to fit said first strip and said frame, rivets securing both strips to the frame and to each other, and another set of rivets independently securing said second strip to said frame.

3. In an endless chain saw, the combination with a saw frame comprising a flat plate and reinforcing strip secured thereto but separated in part therefrom so as to form a guide groove, a chain of grooved saw blades, and a bead formed in the reinforcing piece for engaging said groove.

4. In a chain-saw and in combination with a saw frame or guide, an endless saw composed of blades linked together, said blades having an extending portion provided with a groove and said frame having a bead to enter said groove.

5. In a chain-saw, a frame plate, in combination with an endless saw composed of blades linked together said blades having extensions on the opposite side from the cutting edges provided with grooves, and said plate having a reinforcing strip spaced in part from it to provide a guide groove or channel for said extension, and the side of reinforcing plate having a bead to enter the grooves in said extensions.

In testimony whereof I have affixed my signature, in presence of two witnesses, this 14th day of February 1906.

SAMUEL J. BENS.

Witnesses:
M. R. SEELY,
W. S. BOYD.